US011255305B2

(12) United States Patent
Olivares et al.

(10) Patent No.: US 11,255,305 B2
(45) Date of Patent: Feb. 22, 2022

(54) AIR RECIRCULATION PREVENTION CHECK VALVE FOR THE FUEL DRAIN MANIFOLD

(71) Applicant: Cummins Inc., Columbus, IN (US)

(72) Inventors: Iannelli Olivares, Columbus, IN (US); Bryce Short, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 17/082,882

(22) Filed: Oct. 28, 2020

(65) Prior Publication Data

US 2021/0123400 A1 Apr. 29, 2021

Related U.S. Application Data

(60) Provisional application No. 62/927,266, filed on Oct. 29, 2019.

(51) Int. Cl.
| F02M 37/54 | (2019.01) |
| F02M 55/02 | (2006.01) |
| F02M 59/46 | (2006.01) |
| F02M 37/00 | (2006.01) |

(52) U.S. Cl.
CPC .... *F02M 37/0023* (2013.01); *F02M 37/0017* (2013.01); *F02M 37/0052* (2013.01); *F02M 37/54* (2019.01); *F02M 55/025* (2013.01); *F02M 59/464* (2013.01)

(58) Field of Classification Search
CPC .............. F02M 37/0023; F02M 37/54; F02M 37/0017; F02M 37/0052; F02M 55/025; F02M 59/464

USPC ........................................................ 123/446
See application file for complete search history.

(56) References Cited

U.S. PATENT DOCUMENTS

| 4,452,213 A * | 6/1984 | Duprez .............. F02M 37/0035 123/516 |
| 5,896,846 A * | 4/1999 | Bauer .................. B01D 35/147 123/510 |
| 6,189,516 B1 * | 2/2001 | Hei Ma .................. F02M 17/26 123/514 |
| 6,527,947 B1 * | 3/2003 | Channing .......... F02M 37/0029 210/136 |
| 10,247,150 B1 * | 4/2019 | Koplitz ................ F02M 69/465 |
| 2002/0170545 A1 * | 11/2002 | Ekstam .................. F02M 53/00 123/557 |
| 2003/0041842 A1 * | 3/2003 | Kumagai ........... F02M 63/0295 123/458 |

(Continued)

FOREIGN PATENT DOCUMENTS

EP           0887542 A2 * 12/1998     ............. F02M 37/46

*Primary Examiner* — Mahmoud Gimie
(74) *Attorney, Agent, or Firm* — Faegre, Drinker, Biddle & Reath, LLP (57) ABSTRACT

A manifold configured to inhibit air recirculation in an engine fueling system, the manifold comprising: a housing including an internal chamber in communication with a high pressure pump ("HPP") port configured to receive drain fuel from a HPP; a drain port configured to return fuel to a fuel tank; an air bleed port configured to receive air bled from the fueling system; and a check valve positioned within the internal chamber, the check valve configured to inhibit air from flowing from the air bleed port to the HPP port, thereby inhibiting air recirculation into the engine fueling system.

20 Claims, 5 Drawing Sheets

(56) References Cited

U.S. PATENT DOCUMENTS

| | | | | |
|---|---|---|---|---|
| 2007/0062494 A1* | 3/2007 | Yanagi | ................ | B01D 35/147 |
| | | | | 123/514 |
| 2010/0186831 A1* | 7/2010 | Roman | .............. | G05D 23/1333 |
| | | | | 137/468 |
| 2014/0000727 A1* | 1/2014 | Fisher | ................ | F02M 37/0052 |
| | | | | 137/468 |
| 2018/0030916 A1* | 2/2018 | Nabi | ..................... | F02D 41/263 |
| 2018/0363606 A1* | 12/2018 | Balaji | ................ | F02M 37/0052 |

\* cited by examiner

AIR RECIRCULATION PREVENTION CHECK VALVE FOR THE FUEL DRAIN MANIFOLD

CROSS-REFERENCE TO RELATED APPLICATIONS

The present application claims the benefit of priority to U.S. Provisional Application No. 62/927,266, filed on Oct. 29, 2019, the entire disclosures of which being expressly incorporated herein by reference.

FIELD OF THE DISCLOSURE

The present disclosure generally relates to fueling systems for engines and more specifically to a manifold for selectively separating air from drain fuel to inhibit air recirculation in the fuel supply path.

BACKGROUND OF THE DISCLOSURE

Some engines experience air intrusions within their fueling systems, which can lead to poor engine performance. There are many ways that air can be introduced into a fuel system. For example, during a service event, a fuel system can be opened for a filter change and a large volume of air can be entrapped in the fuel system. Another example is a suction side or drain side fitting leak that can allow a small, continuous volume of air to be added into the fuel system. The air is then recirculated in the low-pressure fuel system, and eventually can build to an amount that degrades engine performance. If an engine loses prime due to a fitting leak, this can lead to hard starts. If air reaches the pump or the injectors, it can lead to no-start and stalling of the engine.

There are alternative designs with air prevention mechanisms, however those designs do not include a fueling system that inhibits fuel gelling under cold weather conditions and provide users the ability to select any type of fuel. Such fuel gelling causes restriction in the fuel supply and results in a variety of engine performance issues such as excessive emissions due to extended fuel injection events. As such, one aspect of fuel systems that has been the focus of designers is the need to produce alternative air prevention designs that mitigate or prevent the occurrence of air intrusion into the fuel system, while maintaining an effective way for recirculating fuel at the correct temperature.

SUMMARY OF THE DISCLOSURE

In one embodiment, the present disclosure provides manifold configured to inhibit air recirculation in an engine fueling system, the manifold comprising: a housing including an internal chamber in communication with a high pressure pump ("HPP") port configured to receive drain fuel from a HPP; a drain port configured to return fuel to a fuel tank; an air bleed port configured to receive air bled from the fueling system; and a check valve positioned within the internal chamber, the check valve configured to inhibit air from flowing from the air bleed port to the HPP port, thereby inhibiting air recirculation into the engine fueling system. In one aspect of this embodiment, the housing further includes a rail port configured to receive drain fuel from a fuel accumulator, and an injector port configured to receive drain fuel from at least one fuel injector, the HPP port, the rail port, the injector port and the drain port being in fluid communication with the internal chamber. Another aspect further the housing includes a recirculation passage in fluid communication with the internal chamber to receive the drain fuel. The housing further includes a drain fuel housing and a thermal recirculation valve housing extending from the drain fuel housing, the internal chamber being disposed in the drain fuel housing, the recirculation passage extending between the drain fuel housing and the thermal recirculation valve housing. The check valve is configured to inhibit air from the air bleed port from entering the recirculation passage. In still another aspect of this embodiment, the check valve is configured to send air to the fuel tank through the tank drain port. The housing further includes a service port configured to be closed unless opened for a service event. The check valve is positioned between the tank drain port and the service port. The HPP port is positioned between the check valve and the service port.

According to another embodiment, the present disclosure provides a vehicle mounted fuel manifold assembly for inhibiting air recirculation in an engine fueling system, the assembly comprising: a manifold housing having an internal chamber, a HPP port, a rail port, an injector port, a drain input port, an air bleed port and a check valve, the HPP port, the rail port, the injector port, the drain input port, the air bleed port and the check valve being in fluid communication with the internal chamber; a conduit comprising a first end configured to couple to a drain port on the engine, a second end configured to couple to the drain input port of the manifold housing and a body configured to transport fuel from the drain port on the engine to the drain input port of the manifold housing; and wherein the check valve is positioned in the internal chamber to inhibit air from recirculating into the engine fueling system.

In one aspect of the present embodiment, the HPP port is configured to receive drain fuel from a HPP, the rail port is configured to receive drain fuel from a fuel accumulator, the injector port is configured to receive drain fuel from at least one fuel injector, the drain port is configured to provide drain fuel to a fuel tank, and the air bleed port is configured to receive air from an air bleed valve. In another aspect of this embodiment the housing further includes a recirculation passage in fluid communication with the internal chamber to receive the drain fuel. The manifold housing further includes a drain fuel housing and a thermal recirculation valve housing extending from the drain fuel housing, the internal chamber being disposed in the drain fuel housing, the recirculation passage extending between the drain fuel housing and the thermal recirculation valve housing. In yet another aspect of the present embodiment, the check valve is in fluid communication with the fuel tank and is configured to allow air to flow to the fuel tank. The manifold housing further includes a service port and the check valve is positioned between the tank drain port and the service port. The HPP port is positioned between the check valve and the service port.

In yet another embodiment, the present disclosure provides a method for preventing air recirculation in an engine fuel system, comprising: routing drain fuel from a fuel pump, a fuel accumulator and at least one fuel injector to an internal chamber of a fuel manifold; routing tank fuel from a fuel tank through a fuel supply passage in the fuel manifold to a filter in a fuel supply path; prohibiting air from an air bleed valve from recirculating into the fuel supply passage; and directing air from the air bleed valve to the fuel tank. Another aspect of this embodiment, further includes a check valve within the internal chamber for directing the air to the fuel tank. In still another aspect of this embodiment, further comprising routing fuel from the internal chamber through a recirculation passage in communication with the internal chamber and a thermal recirculation valve

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Corresponding reference characters indicate corresponding parts throughout the several views. Although the drawings represent embodiments of various features and components according to the present disclosure, the drawings are not necessarily to scale, and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Figure 1:
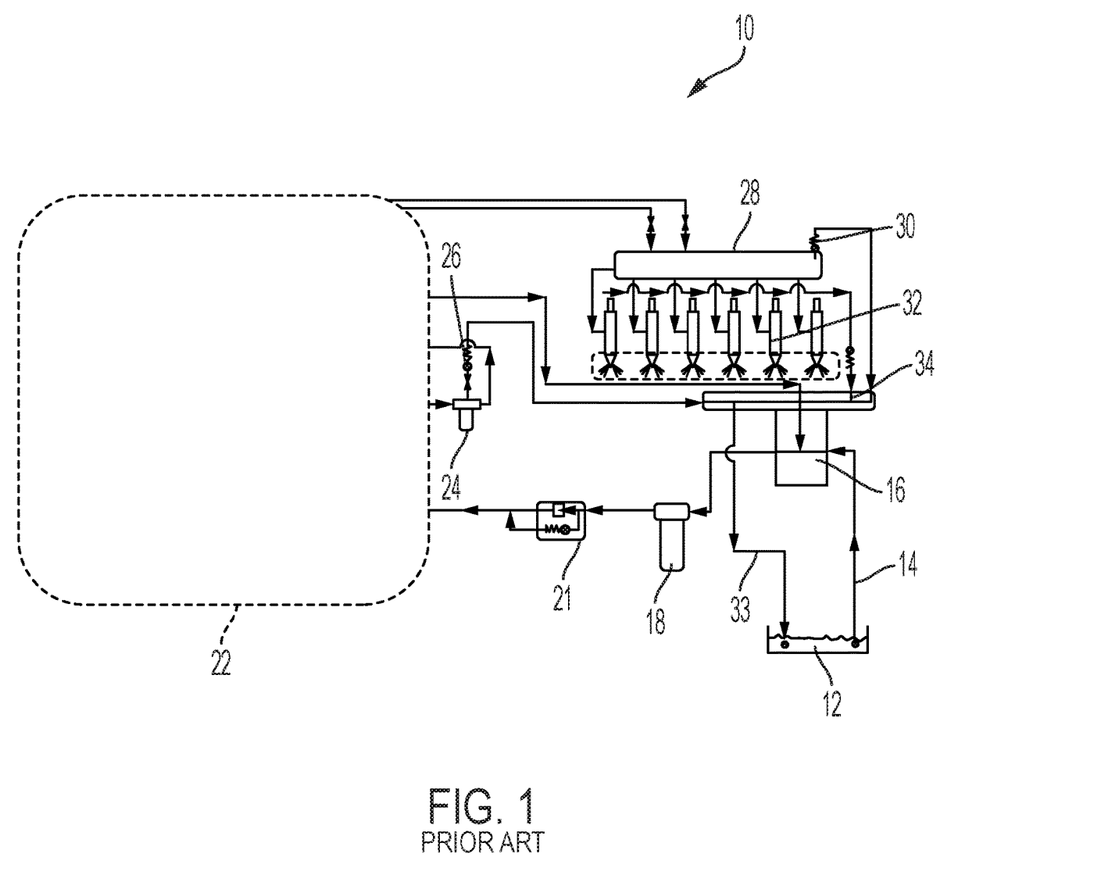
FIG. 1 is a schematic diagram of a prior art engine fueling configuration.

Referring now to FIG. 1, a prior art fueling configuration 10 is shown. The fueling configuration 10 is greatly simplified for clarity of the explanation. Generally, a priming pump 21 on the engine (not shown) is configured to draw fuel from a fuel tank 12, through a fuel inlet 14 of a thermal recirculation valve ("TRV") 16, and from the TRV 16 through a first stage filter 18. Additionally, an air bleed check valve 26 on the engine (not shown) is configured to separates air from the fuel pumped from a high-pressure pump assembly ("HPP") 22 through a second stage filter 24. The fuel then is provided through a variety of other components to the engine cylinders (not shown) for combustion to produce power. Portions of the fuel not supplied to the engine cylinders are drained from components such as HPP 22, a fuel accumulator (such as a common rail accumulator) 28 and/or at least one fuel injector 32. This fuel along with the air from the air check valve is routed to a fuel drain manifold 34, which routes the fuel back to the fuel tank 12 through a fuel return 33. TRV 16, which is connected to the drain manifold 34, is configured to assist the fuel recirculation approach that mixes warm drain fuel with cold supply fuel to increase the temperature of the supply fuel to avoid fuel gelling. In the fueling configuration 10, this fuel recirculation approach can lead to air reentering the fuel system, and eventually building up an amount of air that causes the engine (not shown) to stall. The operation and structure of TRV 16 within the drain manifold is described in detail in U.S. patent application Ser. No. 15/622,830, filed Dec. 20, 2018, entitled "Return Fuel Recycling Manifold," which is co-owned by the applicant, the entire disclosure of which being expressly incorporated herein by reference.

Figure 2:
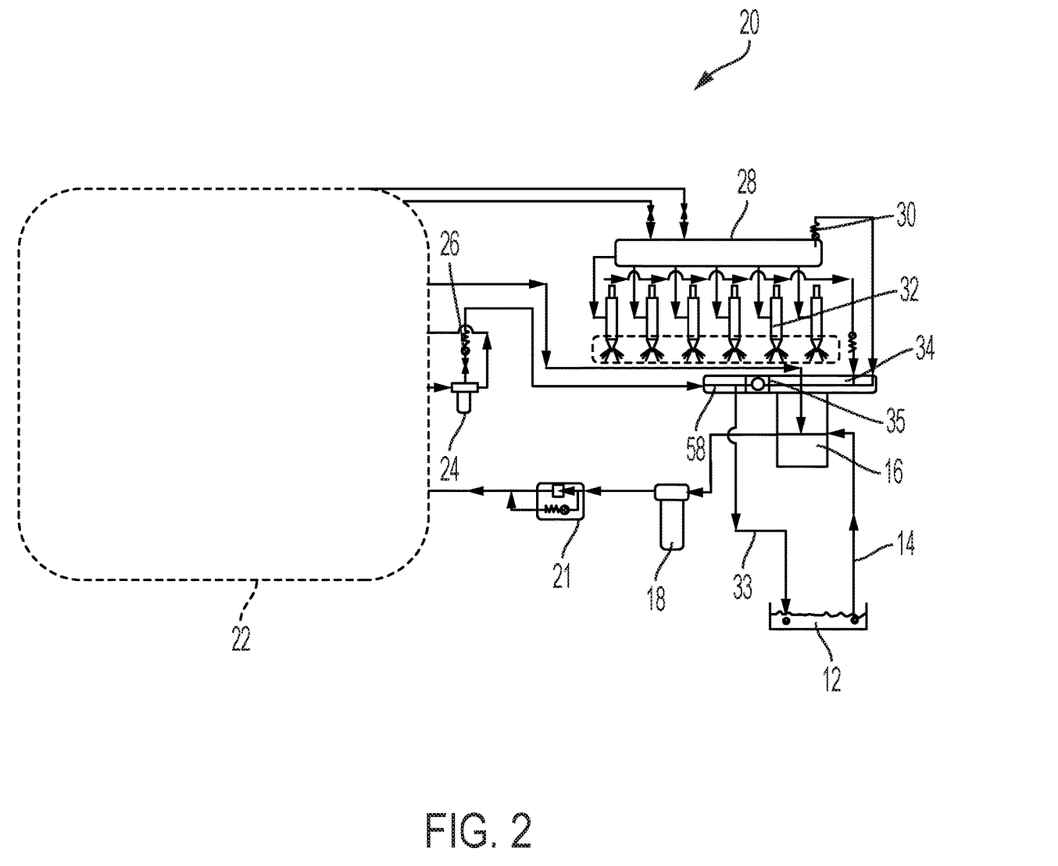
FIG. 2 is a schematic diagram of an engine fueling configuration according to the principles of the present disclosure.

As shown schematically in FIG. 2, the present disclosure provides an air recirculation prevention approach 20 including an additional air check valve 35 within the drain manifold 34 that prohibits the air from reentering the fuel system. In fueling configuration 20, air bleed check valve 26 directs air bled out of the fuel system to an air bleed port 58 within drain manifold 34. TRV 16 performs fuel recirculation within drain manifold 34 as described herein. In configuration 10, air is allowed to recirculate into the fuel system through TRV 16, unlike the air recirculation prevention approach 20 described herein that blocks all air from air bleed check valve 26 from going through check valve 35. Generally, check valve 35 ensures that the only path for the air to enter the fuel tank 12 is through fuel return 33. Check valve 35 within the fuel drain manifold is explained in further detail below.

Figure 3:
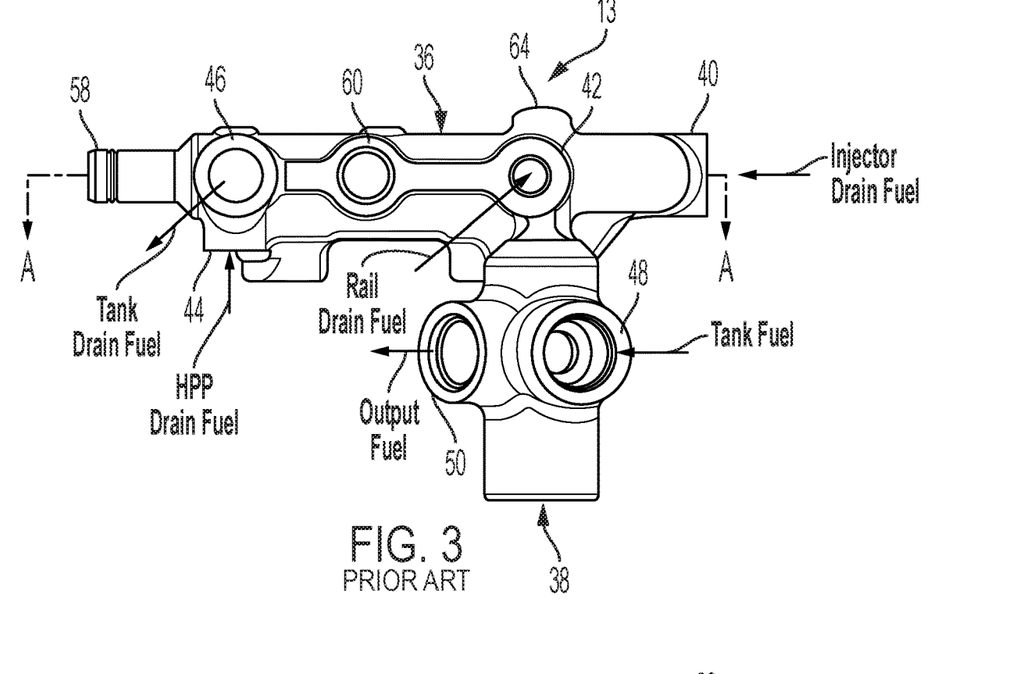
FIG. 3 is a right-side view of a prior art fuel manifold.
Figure 4:
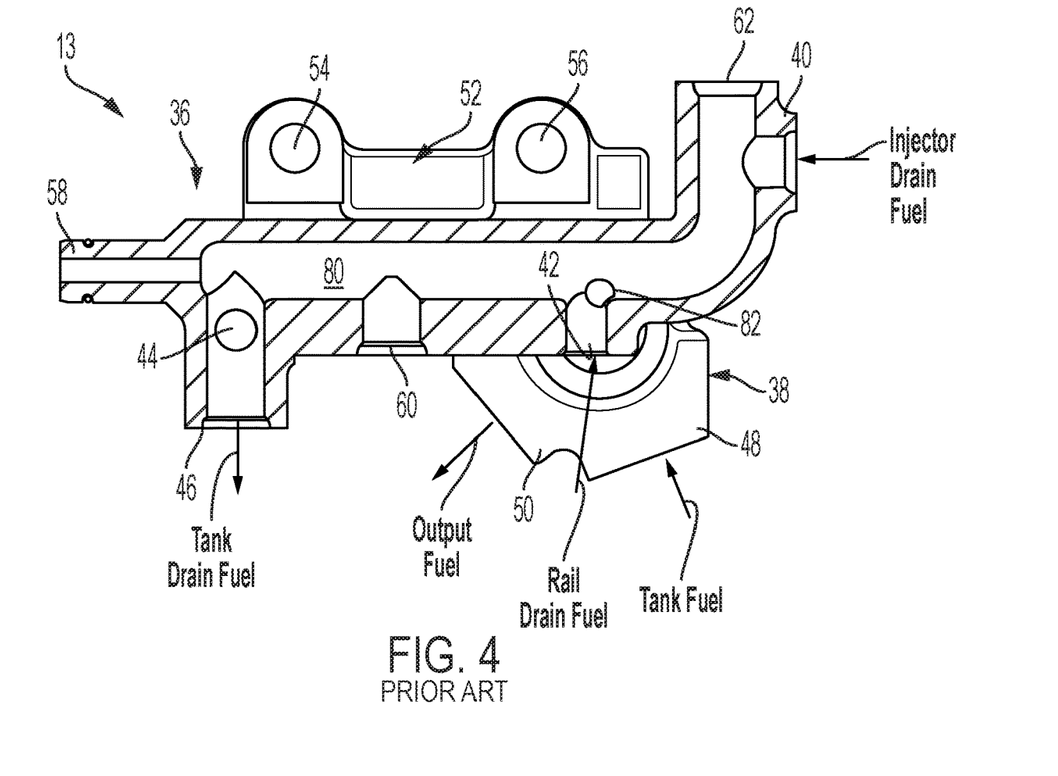
FIG. 4 is a top cross-sectional view of a prior art fuel manifold.

Referring now to FIGS. 3-4, the prior art fuel manifold 13 is shown detached from an engine (not shown). As shown, prior art fuel manifold 13 generally includes a drain fuel housing 36 and a thermal recirculation valve housing 38 which extends from drain fuel housing 36. Drain fuel housing 36 includes an injector port 40, a rail port 42, an HPP port 44 and a drain port 46. Injector port 40 is configured to receive drain fuel from one or more fuel injectors, rail port 42 is configured to receive drain fuel from a fuel accumulator, HPP port 44 is configured to receive drain fuel from HPP 22 and drain port 46 is configured to route drain fuel to fuel tank 14 through fuel return 33. Thermal recirculation valve housing 38 includes a tank fuel port 48 which is configured to receive supply fuel from fuel tank 14 and an output port 50 which is configured to output fuel to filter 18 (FIG. 1). Drain fuel housing 36 further includes an air bleed port 58 which is connected to an on-engine filter, a service port 60 which is normally plugged but available for troubleshooting purposes, an opening 62 (FIG. 4) which is necessary for manufacturing manifold 13 but plugged during use, and an opening 64 which is necessary for forming a recirculation passage described below but plugged during use.

Referring to FIG. 4, a top view of drain fuel manifold 13 shows that housing 36 also includes an internal chamber 80 which is in fluid communication with drain port 46, HPP port 44, rail port 42 and injector port 40. Internal chamber 80 collects drain fuel from HPP port 44, rail port 42 and injector port 40, and releases drain fuel from drain port 46 to fuel tank 14 in the manner described above. A recirculation passage 82 is in flow communication with internal chamber 80 to provide drain fuel to thermal recirculation valve housing 38. Drain fuel manifold 13 allows air from air bleed port 58 to enter into thermal recirculation valve housing 38 through recirculation passage 82. This results in a mix of fuel and air being reintroduced into the engine fueling system through output port 50.

Figure 5:
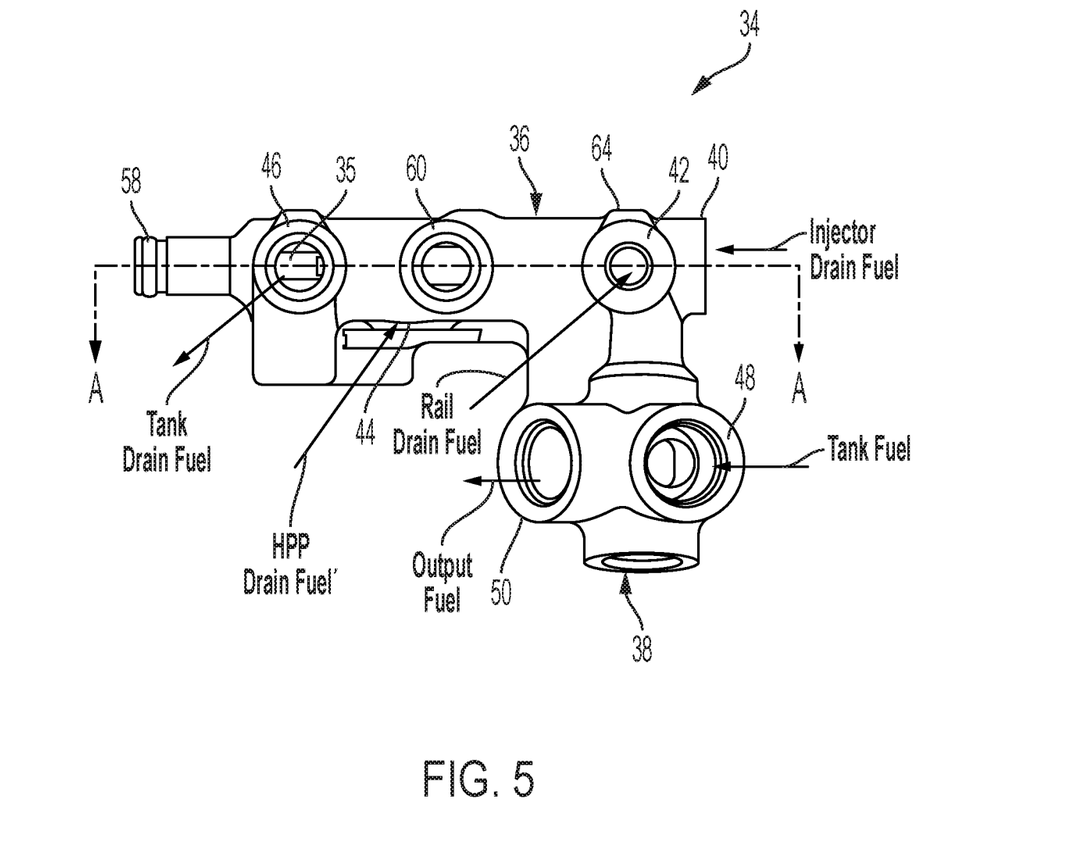
FIG. 5 is a right-side view of the fuel manifold, according to some embodiments of the present disclosure.
Figure 6:
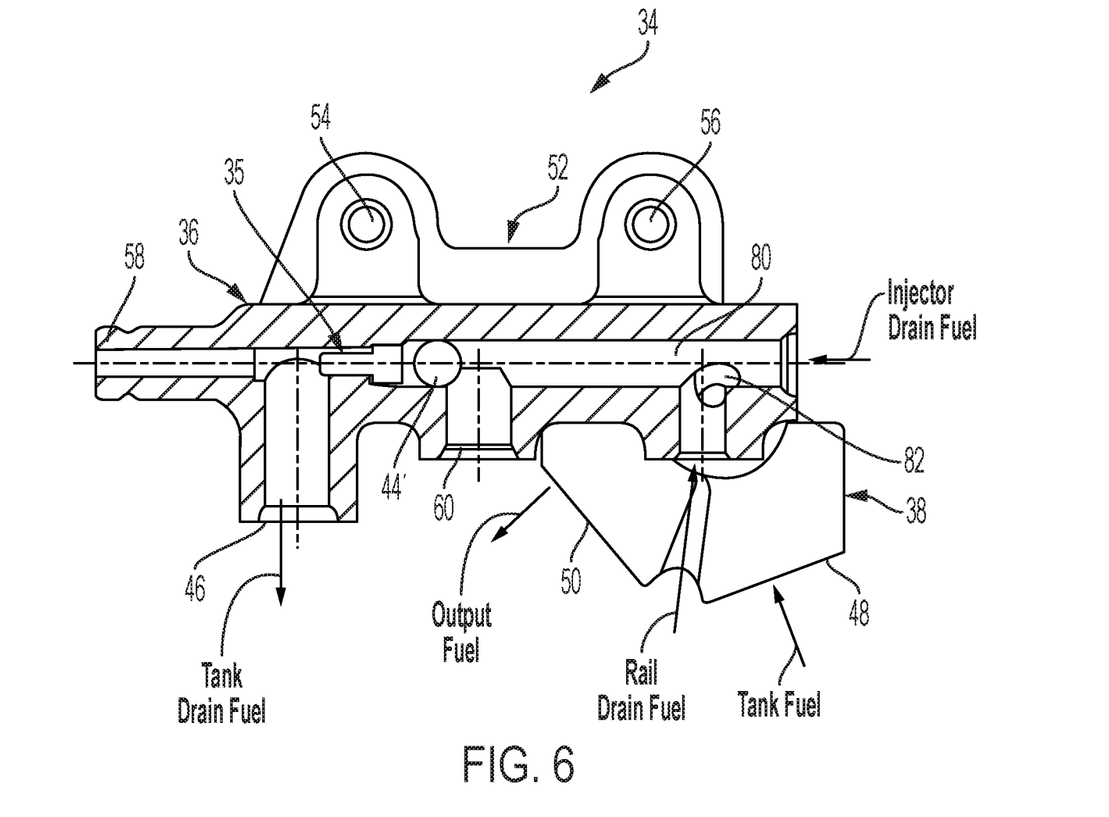
FIG. 6 is a top cross-sectional view of a fuel manifold as depicted in FIG. 5.

FIGS. 5-6 show a fuel drain manifold 34 of the present disclosure according to various embodiments, which generally includes a drain fuel housing 36 and a thermal recirculation valve housing 38 which extends from the drain fuel housing. In addition to an injector port 40, a rail port 42, a HPP port 44' and a drain port 46, the drain fuel housing 36 also includes an air check valve 35 configured to prohibit air from an air bleed port 58 from reentering the fuel system, in accordance with some embodiments. In certain embodiments, the drain fuel housing 36 further includes a mounting flange 52 including a pair of openings 54, 56 sized to receive fasteners (not shown) used to attach manifold 34 to engine (not shown). In some examples, the drain fuel housing 36 defines the injector port 40, the rail port 42, the HPP port 44' and the drain port 46. In various examples, the injector port 40 is configured to receive drain fuel from one or more fuel injectors 32; the rail port 42 is configured to receive drain fuel from a fuel accumulator 28; the HPP port 44' is configured to receive drain fuel from HPP 22; and the drain port 46 is configured to route drain fuel to the fuel tank 12 through the fuel return 33. In some examples, the thermal recirculation valve housing 38 includes a tank fuel port 48 configured to receive supply fuel from the fuel tank 12 and an output port 50 configured to output fuel to a filter (e.g., one similar to filter 18 of FIG. 2). In certain examples, the drain fuel housing 36 further includes an air bleed port 58 connected to an on-engine filter, a service port 60 normally plugged during use but available for troubleshooting purposes, an opening 62 normally plugged during use but used for manufacturing the manifold 32, and an opening 64 normally plugged during use but used for forming a recirculation passage described below.

FIG. 6 shows a top view of drain fuel manifold 34, according to various embodiments. As shown, the drain fuel manifold 34 includes a housing 36, an internal chamber 80 in fluid communication with the injector port 40, the rail port 42, the HPP port 44' and drain port 46. Unlike HPP port 44 of the prior art manifold 13 (see FIG. 4), HPP port 44' of the manifold 34 is positioned between the drain port 46 and the service port 60, in accordance with various embodiments of the present disclosure. In various embodiments, the internal chamber 80 is configured to collect drain fuel from the HPP port 44', the rail port 42 and the injector port 40, and to release drain fuel from the drain port 46 to the fuel tank 12 in the manner described above. In some embodiments, the drain fuel manifold 34 includes a recirculation passage 82 in fluid communication with the internal chamber 80 to provide drain fuel to the thermal recirculation valve housing 38. In certain embodiments, the drain fuel manifold 34 includes an air check valve 35 positioned within the internal chamber 80 between the drain port 46 and the HPP port 44'. In certain examples, the air check valve 35 is configured to be a one-way valve, through which air can pass through in a flow direction toward the drain port 46 and contrastly, cannot pass through check valve 35 in a flow direction toward the HPP port 44'. As a result, in various examples, air routed from check valve 26 to air bleed port 58 can only flow into drain port 46 where it would be returned to fuel tank 12. Advantageously, air is prevented by air check valve 35 from flowing into the HPP port 44' where it would be recirculated back into the fuel system, potentially degrading the engine performance.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A manifold configured to inhibit air recirculation in an engine fueling system, the manifold comprising:
a housing including an internal chamber in fluid communication with a high-pressure pump ("HPP") port configured to receive drain fuel from a HPP;
a drain port configured to return fuel to a fuel tank;
an air bleed port configured to receive air bled from the engine fueling system; and
an air check valve positioned within the internal chamber, the air check valve configured to inhibit air from flowing from the air bleed port to the HPP port, thereby inhibiting air recirculation into the engine fueling system.

2. The manifold of claim 1, wherein the housing further includes a rail port configured to receive drain fuel from a fuel accumulator, and an injector port configured to receive drain fuel from at least one fuel injector, the HPP port, the rail port, the injector port and the drain port being in fluid communication with the internal chamber.

3. The manifold of claim 1, wherein the housing further includes a recirculation passage in fluid communication with the internal chamber to receive the drain fuel.

4. The manifold of claim 3, wherein the housing includes a drain fuel housing and a thermal recirculation valve housing extending from the drain fuel housing, the internal chamber being disposed in the drain fuel housing, the recirculation passage extending between the drain fuel housing and the thermal recirculation valve housing.

5. The manifold of claim 3, wherein the air check valve is configured to inhibit air from the air bleed port from entering the recirculation passage.

6. The manifold of claim 1, wherein the air check valve is configured to send air to the fuel tank through the drain port.

7. The manifold of claim 1, wherein said housing further includes a service port configured to be closed unless opened for a service event.

8. The manifold of claim 7, wherein the air check valve is positioned between the drain port and the service port.

9. The manifold of claim 7, wherein the HPP port is positioned between the air check valve and the service port.

10. A vehicle mounted fuel manifold assembly for inhibiting air recirculation in an engine fueling system, the assembly comprising:
   a manifold housing having an internal chamber, a HPP port, a rail port, an injector port, a drain input port, an air bleed port and an air check valve, the HPP port, the rail port, the injector port, the drain input port, the air bleed port and the check valve being in fluid communication with the internal chamber;
   a conduit comprising a first end configured to couple to a drain port on the engine, a second end configured to couple to the drain input port of the manifold housing and a body configured to transport fuel from the drain port on the engine to the drain input port of the manifold housing; and
   wherein the air check valve is positioned in the internal chamber and is configured to inhibit air from flowing from the air bleed port to the HPP port, thereby inhibiting air from recirculating into the engine fueling system.

11. The manifold assembly of claim 10, wherein the HPP port is configured to receive drain fuel from a HPP, the rail port is configured to receive drain fuel from a fuel accumulator, the injector port is configured to receive drain fuel from at least one fuel injector, the drain port is configured to provide drain fuel to a fuel tank, and the air bleed port is configured to receive air from an air bleed valve.

12. The manifold assembly of claim 10, wherein the housing further includes a recirculation passage in fluid communication with the internal chamber to receive the drain fuel.

13. The manifold assembly of claim 12, wherein the manifold housing includes a drain fuel housing and a thermal recirculation valve housing extending from the drain fuel housing, the internal chamber being disposed in the drain fuel housing, the recirculation passage extending between the drain fuel housing and the thermal recirculation valve housing.

14. The manifold assembly of claim 10, wherein the air check valve is in fluid communication with the fuel tank and is configured to allow air to flow to the fuel tank.

15. The manifold assembly of claim 10, wherein said manifold housing further includes a service port and the air check valve is positioned between the drain port and the service port.

16. The manifold assembly of claim 15, wherein the HPP port is positioned between the air check valve and the service port.

17. The manifold assembly of claim 10, further comprising at least one fastener configured for mounting the manifold housing to the vehicle.

18. A method of preventing air recirculation in an engine fuel system, comprising:
   routing drain fuel from a fuel pump, a fuel accumulator and at least one fuel injector to an internal chamber of a fuel manifold;
   routing tank fuel from a fuel tank through a fuel supply passage in the fuel manifold to a filter in a fuel supply path;
   prohibiting air from an air bleed valve from flowing to a HPP port such that air is prohibited from recirculating into the fuel supply passage; and
   directing, within the internal chamber, air from the air bleed valve to the fuel tank.

19. The method of claim 18, further comprising using a air check valve within the internal chamber for directing the air to the fuel tank.

20. The method of claim 18, further comprising routing fuel from the internal chamber through a recirculation passage in communication with the internal chamber and a thermal recirculation valve.

* * * * *